US009769139B2

United States Patent
Chizhov et al.

(10) Patent No.: US 9,769,139 B2
(45) Date of Patent: Sep. 19, 2017

(54) ON-PREMISES AGENT FOR MOBILE CLOUD SERVICE

(71) Applicant: Oracle International Corporation, Redwood Shores, CA (US)

(72) Inventors: Vladimir Yurievich Chizhov, St. Petersburg (RU); Aleksei Vasilievich Mokeev, Karlsruhe (DE); Kaj Van De Loo, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 87 days.

(21) Appl. No.: 14/771,745

(22) PCT Filed: Sep. 10, 2014

(86) PCT No.: PCT/RU2014/000677
§ 371 (c)(1),
(2) Date: Aug. 31, 2015

(87) PCT Pub. No.: WO2015/119529
PCT Pub. Date: Aug. 13, 2015

(65) Prior Publication Data
US 2016/0028688 A1 Jan. 28, 2016

Related U.S. Application Data

(60) Provisional application No. 61/937,316, filed on Feb. 7, 2014.

(51) Int. Cl.
*H04L 29/06* (2006.01)
*H04L 12/24* (2006.01)
(Continued)

(52) U.S. Cl.
CPC .............. *H04L 63/08* (2013.01); *G06F 8/65* (2013.01); *G06F 21/6236* (2013.01);
(Continued)

(58) Field of Classification Search
CPC .............. G06F 15/16; G06F 17/30861; H04L 12/6418; H04L 67/42; H04L 69/24;
(Continued)

(56) References Cited

U.S. PATENT DOCUMENTS 7,349,955 B1 * 3/2008 Korb ....................... H04L 29/06
709/219
9,037,735 B1 * 5/2015 Fallows ................. H04L 67/42
709/228

(Continued)

FOREIGN PATENT DOCUMENTS

WO 2013/0126570 A1 8/2013

OTHER PUBLICATIONS

International Application No. PCT/RU2014/000677, International Search Report and Written Opinion mailed on Feb. 19, 2015, 13 pages.

*Primary Examiner* — Thanhnga B Truong
(74) *Attorney, Agent, or Firm* — Kilpatrick Townsend & Stockton LLP

(57) ABSTRACT

Systems, devices, and methods are disclosed for an agent device within a company's network firewall to initiate an HTTP connection with a cloud-based gateway and then upgrade the connection to a WebSockets protocol in order to have an interactive session. Over this interactive session, a mobile device, which connects to the cloud-based intermediary, can request data from servers inside the company's firewalls. Because the firewall is traversed using HTTP protocols (with WebSockets), it can be as safe as letting employees browse the web from inside the company's network.

17 Claims, 11 Drawing Sheets

(51) Int. Cl.
*G06F 9/445* (2006.01)
*H04W 12/06* (2009.01)
*G06F 21/62* (2013.01)
*H04L 29/08* (2006.01)
*H04W 4/18* (2009.01)

(52) U.S. Cl.
CPC .......... *H04L 41/0226* (2013.01); *H04L 63/02* (2013.01); *H04L 63/029* (2013.01); *H04L 63/0815* (2013.01); *H04L 63/0853* (2013.01); *H04L 63/10* (2013.01); *H04L 67/02* (2013.01); *H04L 67/141* (2013.01); *H04L 67/34* (2013.01); *H04L 69/08* (2013.01); *H04W 12/06* (2013.01); *H04L 63/0227* (2013.01); *H04L 63/0281* (2013.01); *H04L 63/0884* (2013.01); *H04L 67/2823* (2013.01); *H04W 4/18* (2013.01)

(58) Field of Classification Search
CPC ............. H04L 65/1069; H04L 65/1083; H04L 67/141; H04L 67/08; H04L 67/2823; H04L 67/02; H04L 67/40; H04L 67/303; H04L 67/04; H04L 5/1438; H04L 67/2828; H04L 69/08; H04L 69/329; H04M 3/4938; H04M 7/0036; H04W 28/06; H04W 4/00
USPC ..... 726/12, 14; 709/228, 227, 219, 237, 232
See application file for complete search history.

(56) References Cited

U.S. PATENT DOCUMENTS

| | | | |
|---|---|---|---|
| 2005/0132351 A1* | 6/2005 | Randall | G06F 11/1433 717/168 |
| 2013/0275492 A1 | 10/2013 | Kaufman et al. | |
| 2014/0025832 A1 | 1/2014 | Ito | |
| 2014/0075541 A1* | 3/2014 | Young | H04L 12/6418 726/14 |
| 2015/0052256 A1* | 2/2015 | Fenstad | H04L 67/40 709/227 |

* cited by examiner

ON-PREMISES AGENT FOR MOBILE CLOUD SERVICE

CROSS-REFERENCES TO RELATED APPLICATIONS

This application is a U.S. National Stage of International Application No. PCT/RU2014/000677, filed Sep. 10, 2014, which claims the benefit of U.S. Provisional Patent Application No. 61/937,316, filed Feb. 7, 2014, the disclosures of which are hereby incorporated by reference in their entireties for all purposes.

BACKGROUND

A company's enterprise applications running on the company's servers are typically accessed by employees' work computers. The work computers are maintained by company information technology (IT) departments, and configurations are tightly controlled. The work computers, such as laptop computers or desktop workstations, plug into office network jacks or log into encrypted wireless networking hubs. All of the devices, computers and servers, are protected from the Internet by one or more firewalls.

Users are demanding more and more access to company data while on the road, at home, or at other areas outside of companies' offices. For example, salespeople for a company sometimes wish to access contact lists and other well-guarded proprietary data from the company's servers while they are travelling. IT departments have evolved to issuing company-owned mobile devices that they maintain. These include not only the laptop computers that they have supported for some time, but also netbooks and smart phones.

Due to the declining price of consumer electronics in general, users often purchase newer smartphones and computers than those provided by their companies. As a result, the users' personal electronic devices are often more powerful than those provided by the companies' IT departments. With greater processing power, memory and bandwidth available on their own devices than those issued by their companies, some users opt to use their own devices for many company functions that would otherwise be performed on company-issued devices.

Chief information officers (CIOs) may balk at having his or her employee's own personal, BYOD (bring your own device) mobile electronic devices accessing company servers. The threat of a security breach from a user's, malware-infected mobile device is just too great. Yet, the lure of not having to purchase or maintain another user device—one which the user wants to use anyway—is promising.

There is a need in the art for safe access to data on a company's enterprise application servers using employees' own mobile devices.

BRIEF SUMMARY

Generally, an agent device within a company's firewall and connected internally to company servers is described that also safely connects to an external, cloud-based gateway with which mobile devices connect. The internally controlled agent initiates communications using hypertext transport protocol (HTTP) with the external, cloud-based gateway and then upgrades the connection to a WebSockets protocol for more interactive functionality.

The agent can automatically update its own software from the cloud-based gateway depending on the time of day and other settings. For example, there may be a time window in which no updates may occur. Also, if an update occurs and is unsuccessful, it can be rolled back to a previous version.

Some embodiments of the invention are related to a method of facilitating offsite access to an enterprise computer network. The method includes initiating, from an agent executing on a computer behind a firewall on an enterprise network, a hypertext transport protocol (HTTP) connection with a cloud-based gateway outside of the firewall, upgrading the HTTP connection to a WebSocket protocol connection, receiving, at the agent over the WebSocket protocol connection, a request for data from the gateway, reformatting, at the agent, the request into an HTTP request, sending, from the agent, the HTTP request to a server on the enterprise network, receiving, at the agent, a response to the HTTP request from the server, creating, at the agent, a WebSocket response based on the response from the server, and sending, from the agent over the WebSocket protocol connection to the gateway, the WebSocket response.

The upgrading of the HTTP connection to the WebSocket protocol connection can be automatically triggered by the initiating of the HTTP connection. The method can include receiving, at the cloud-based gateway, a request from a mobile device, reformatting, at the gateway, the request from the mobile device into the request for data over the WebSocket protocol, receiving, at the gateway, the WebSocket response from the agent, creating, at the gateway, a cloud-enabled response from the WebSocket response from the agent, and sending the cloud-enabled response to the mobile device.

The method can include packaging, by the agent, the response from the server into a string, binary object, or ArrayBuffer of the WebSocket response before sending the WebSocket response. The server can be a local web server, and/or the server can be running an enterprise application. The WebSocket connection can be a secure WebSocket connection.

The method can include checking, by the agent with the cloud-based gateway, for an update of agent software, downloading, to the agent, a software update, and installing, at the agent, the downloaded software update. The method can further include determining a time window acceptable or unacceptable for the software update, and performing the checking, downloading, or installing based on the determined time window. The method can include rolling back the installation of the downloaded software update to a version of the agent software.

Yet other embodiments relate to systems and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Figure 1:
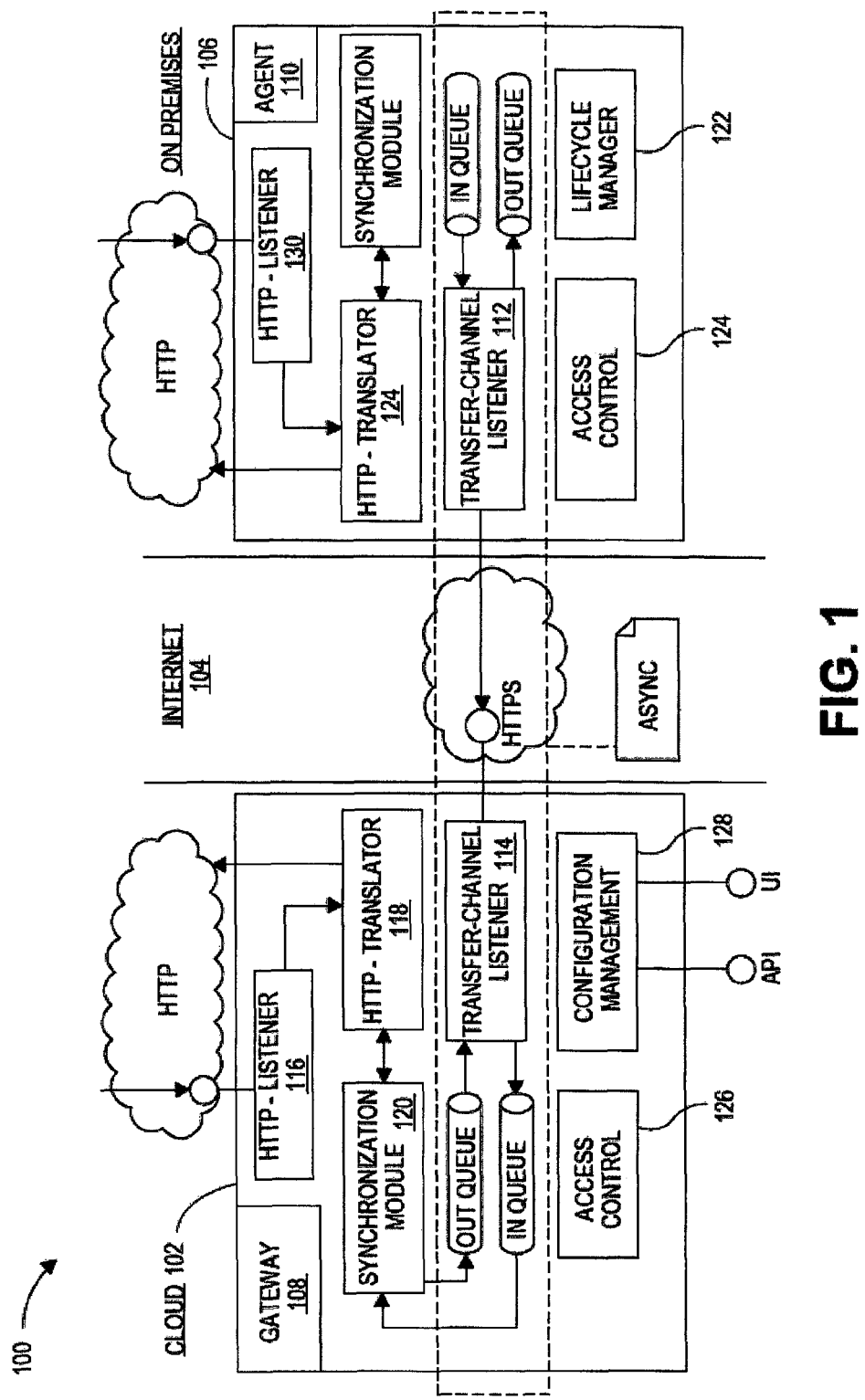
FIG. 1 illustrates component models in accordance with an embodiment.

In general, embodiments are related to an agent server that is behind a company's firewall initiates a connection with a gateway server in a trusted cloud via the HTTP protocol (typically port 80, but can be any port range) and then upgrades the connection to the WebSocket protocol. Using the established, two-way WebSocket connection, communication between a mobile device that is outside of the company's firewall is facilitated with the company's server.

The "WebSocket protocol" is standardized by the Internet Engineering Task Force (IETF) as (Request For Comments) RFC 6455, or as otherwise known in the art.

Technical advantages of using the WebSocket protocol, as opposed to other protocols, are its similarity to HTTP, which allows WebSocket packets to pass through corporate network firewalls without further configuration of firewalls, the network, etc. If a chief technology officer allows his or her employees to access the Web from the corporate network computers (using the ubiquitous HTTP protocol), then there is not much of a leap to use WebSockets for allowing communication. After all, limiting traffic to that which is similar to HTTP does not allow hackers to easily take over full, administrative control of protected network servers. The WebSocket protocol is used in centralized, massively multiplayer online (MMO) gaming, where it is reliable and secure. It allows near real-time communication between computers, so it is well suited for the video gaming industry. Near real-time communication may not be necessary for corporate networks, but the security that WebSockets presents, denying many traditional hacking avenues around firewalls, is advantageous for corporate networks.

General Use Cases

Enterprise applications accessed from a cloud can include Oracle Software as a Service (SaaS) and Platform as a Service (PaaS) assets, such as Oracle Fusion Customer Resource Management (CRM) with custom extensions, RightNow, Taleo, and SaaS Human Capital Management (HCM). SaaS HCM can include a company directory, worker portrait, approvals, recruiting, resume screening, goals, and candidate screening.

Company on-premises assets can include server applications running a plurality of vendors' applications. Some assets can include the Oracle E-Business Suite, including service orders, transportation, Agile Product Lifecycle Management (PLM), request status, and orders. Siebel CRM includes pharma sales life sciences, pharma sales rep, opportunities, service orders service request status, retail execution consumer goods, TPM consumer goods, contacts, and field service. PeopleSoft applications can include those for expenses, requisitions, approval, and a company directory. JD Edwards applications can include those for expenses, requisitions, and purchase order (PO) approval.

Third-party SaaS assets can include those from salesforce.com, Amazon Hosted Services, such as EC2 (compute), S3 (storage), Simple Notification Service (SNS), and Beanstalk, Google, such as AppEngine/Compute Engine, Cloud Storage, maps (directions, distance matrix, elevation, geocoding, time zone, places), apps (calendar, tasks, gmail, contacts, drive, spreadsheets, sites), Google+, and commerce (shopping, payment, and wallet), and NEST. Mobile-only or mobile-first assets can be created for data storage, including relational, file/LOB, and NoSQL/unstructured, and for application user profile information.

Connectivity Use Cases

A mobile cloud service can invoke an on-premises SOAP/XML (WSDL) service. For example, the mobile cloud service can expose on-premises E-Business Suite Order Entry functionality to a mobile client. A mobile client can use JSON (JavaScript Object Notation) to interact with a mobile application programming interface (mAPI) exposed by the mobile cloud service, which does data translation before connecting on-premise.

A mobile cloud service can invoke an on-premises Representational State Transfer (REST) (JSON/XML) service. For example, an employee self-service application can be REST-enabled using an SOA architecture. The application can be by employees when connected to the company's intranet. A mobile client can use JSON to interact with the mAPI exposed by the Mobile Cloud Service, which composes multiple REST calls to provide a single-page UI (user interface) for the mobile client.

Event (XML, etc.) propagation can be facilitated from an on-premises application to the mobile cloud service. For example, an internal recruitment portal can be available to employees when connected to the intranet. When an employee applies for a job, a notification may be sent to a hiring manager's mobile device (with basic information about the applicant's experience). The applicant event is propagated from on-premises recruitment application to the mobile cloud service, which notifies the manager's mobile client application (for example, after performing XML to JSON translation).

Event (defined by Extensible markup Language (XML), etc.) propagation can be facilitated from a cloud to an on-premises application (in addition to mobile clients). For example, a lead created in an Oracle sales cloud may be synchronized (asynchronously) with an on-premises Siebel CRM (Customer Relationship Management) for campaign management. In addition, the lead can also be pushed to mobile devices of sales representatives in the territory (based on subscriptions).

Moving files (e.g., documents, images) from a mobile cloud service to an on-premises application can be facilitated. For example, bills scanned on the mobile client and attached to the expense report mobile application may be stored on premises so that a third-party provider can validate the bill files using an existing on-premises web-based application. Earlier expense reports could be submitted using a web-based application that is only available when connected to the intranet. It can also be modeled from mobile client to a Mobile Cloud Service (MCS) as JSON with attachments. In this case, the mobile cloud service can store attachments as files using a cloud-based storage service and then move the files from the cloud to an on-premises storage server.

Other connectivity use cases include moving files from on-premises applications to a mobile cloud service, moving batches of files from the mobile cloud service to on-premises applications, and moving batches of files from an on-premises application to a mobile cloud service.

Execution Flow Examples

In an example, an application in the cloud can call a REST WebService from an on-premises environment. The client from the cloud calls a REST service from a gateway, e.g.:

http://mygateway.oraclecloud.com/mypremise_com/service_name

The call is transferred to on-premises, and an agent calls the real service, e.g.:

http://mypremise.com/service_name

The agent handles the response and transfers the response to the cloud. The gateway provides the client with the response. These steps provide transparency of invocation for both the service and the client.

In another example, an event is generated in the cloud and is propagated to an on-premises environment. The on-premises service calls:

http://mypremise.com/event_handler which is expected to be invoked in case of the event. The gateway representation http://mygateway.oraclecloud.com/mypremise_com/event_handler of this service is registered in the cloud app as an event handler. When an event occurs, the service:

http://mygateway.oraclecloud.com/mypremise_com/event_handler is invoked.

In yet another example, an event is generated in an on-premises environment and is propagated to the cloud. Assuming that the event is processed by:

http://oraclecloud.com/event_from_enterprise_handler

The application on premises calls:

http://myagent.mypremise.com/oraclecloud_com/event_from_enterprise_handler

This call is transferred to the cloud, and the gateway calls the real service:

http://oraclecloud.com/event_from_enterprise_handler

In another example, a large amount of data is to be transferred from the cloud to an on-premises system. Assuming that the data is processed by:

http://mypremise.com/upload_service

The steps are the same as in the first example noted above except that HTTP POST is used for the file upload.

Another example is for data to be streamed from on-premises to the cloud. The client from the cloud calls a service from the gateway, e.g.:

http://mygateway.oraclecloud.com/mypremise_com/media_streaming

This call is transferred on-premises (through the WebSockets protocol) and the agent calls the real service:

http://mypremise.com/media_streaming

The agent handles the response and transfers it to the cloud. The gateway provides the client with the response. Any streaming protocol that works inside of HTTP may function well.

Mobile Cloud Service (MCS)

The term "connectivity" denotes here a low-level, base part of integration, or as otherwise known in the art. It can be a simple bridge between cloud and on-premises environments, it can be synchronous in both directions (e.g., cloud to on-premises and vice versa), transaction propagation or compensation actions, protocol translation, data transformation, service orchestration/aggregation, and message sequencing/parallelization may not all be a part of connectivity.

FIG. 1 illustrates component models in accordance with an embodiment. In system 100, a cloud-based system 102 is connected through Internet 104 with on-premises system 106 using HTTP.

Gateway 108 is available as a cloud service, while agent 110, which is a deployment node, is available for on-premises deployment as a software, virtual, or hardware appliance.

Agent 110 to gateway 108 deployment relations can be characterized as many-to-many. One cloud-based gateway instance may accept connections from several agent instances (in parallel). One agent instance may connect to several gateway instances (in parallel).

Agent-to-service and gateway to service protocol stacks may be symmetric (not necessarily equal because they have the same top-level protocol). In some designs, all enterprise services can be exposed as web services. The cloud may limit any external communication to HTTP(S) (i.e., secure HTTP).

An agent-to-gateway communication protocol limits the agent to work through web-proxies, both explicit and transparent. A communication channel from the agent to the gateway goes through a public network (e.g., Internet 104) and therefore should be protected. Content protection on top of the pure HTTP is possible but may have no advantages in comparison with industry-standard HTTPS.

WebSocket is a suitable protocol for use between the data and HTTP protocol. Comet may also work, such as "long-polling" and "http streaming."

In the figure, transfer-channel listener is a client module, that established a connection with gateway 108 and performs data interaction over this bidirectional transfer channel in asynchronous mode.

HTTP-listener 116 listens for inbound HTTP-requests from enterprise systems and sends the HTTP-requests to gateway 108. It synchronously returns given responses.

HTTP-translator 118 receives HTTP-requests from the gateway and forwards the HTTP-requests to enterprise services. It synchronously returns given responses to the gateway.

Synchronization module 120 performs synchronization logic on top of data packets queuing. It provides synchronous (request/response) API for HTTP-translator and asynchronous API (send/receive) for the transfer-channel client.

Lifecycle-manager 122 performs self-maintenance, monitoring and remote management tasks and is responsible for agent features like zero-downtime, zero maintenance cost and other.

Access control 124 and 126 are local policy storage and appliances for cloud-to-service access control.

In gateway 108, transfer-channel listener 114 listens for inbound connections from agent 110 and performs data interaction over this bidirectional transfer channel in asynchronous mode.

HTTP-listener 130 listens for inbound HTTP-requests from cloud systems and sends the HTTP-requests to agent 110. It synchronously returns given responses.

HTTP-translator 124 receives HTTP-requests from Agent and forwards the HTTP requests to cloud services 102. It synchronously returns given responses to the agent.

Synchronization module 120 performs synchronization logic on top of data packets queuing. It provides synchronous (request/response) API for HTTP-translator and asynchronous API (send/receive) for the transfer-channel listener.

Access control 126 is a remote policy storage and appliance for cloud-to-service and enterprise-to-service access control.

Configuration manager 128 is a cloud storage and management interface (API or UI or both) for connectivity administration.

Figure 2:
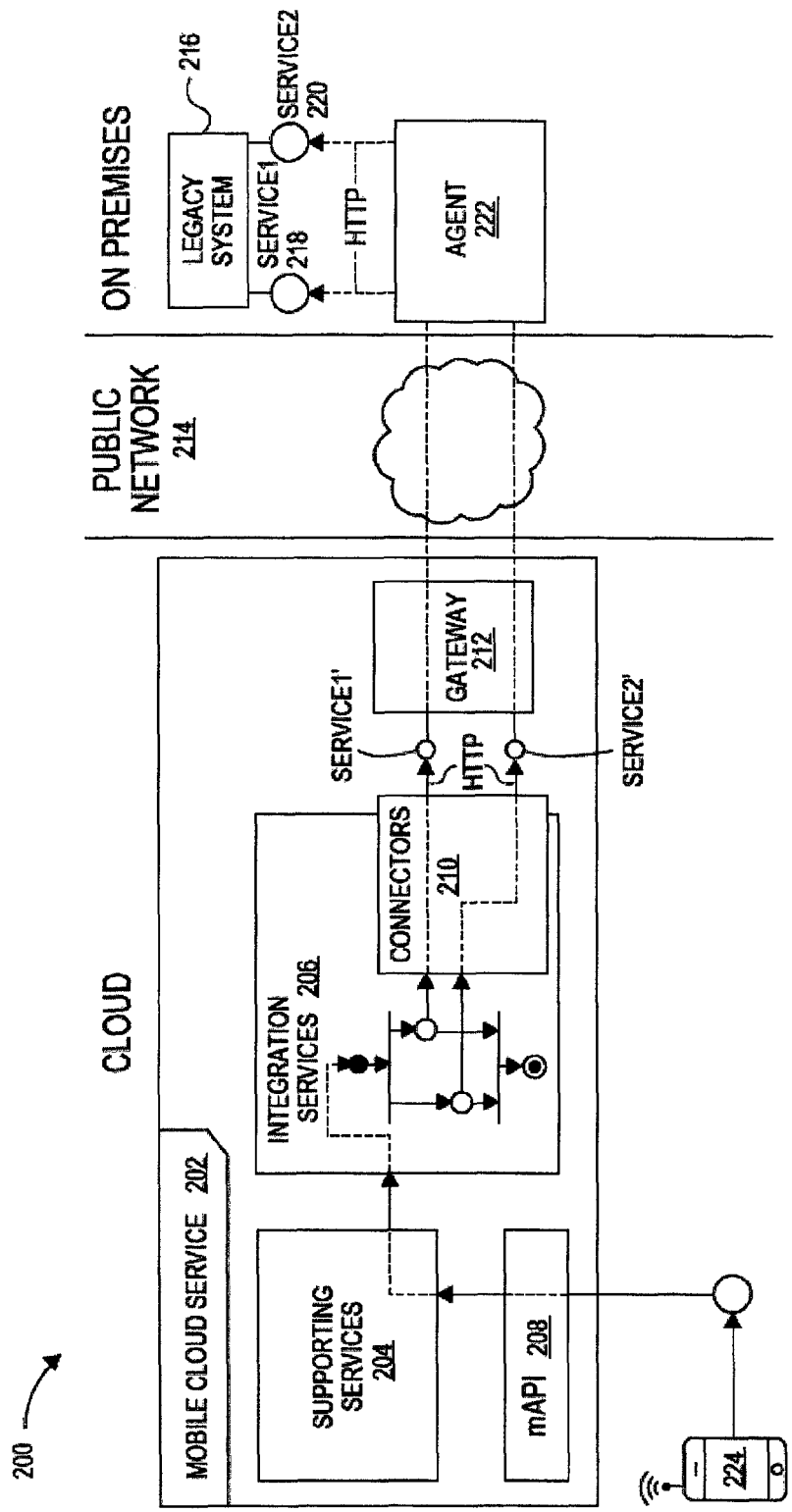
FIG. 2 illustrates integration services as a component of mobile cloud services in accordance with an embodiment.

FIG. 2 illustrates integration services as a component of mobile cloud services in accordance with an embodiment. In system 200, mobile cloud service 202 is in the cloud, behind a firewall, and it can act as an interface between mobile device 224 and on premises legacy system 216.

Mobile device 224 communicates through mAPI (mobile Application Programming Interface) 208, which forwards its messages to supporting services 204. Supporting services 204 send the messages to integration services 206, which includes connectors 210. Connectors 210 couple with gateway 212.

Mobile cloud service 202 reformats, at gateway 212, requests from mobile device 224 into a WebSocket protocol-compliant message. Gateway 212 receives WebSocket protocol compliant responses from the on-premises enterprise network and creates a cloud-enabled response from the responses to send to the mobile device.

At the on-premises geographic location of the legacy system, agent 222 may be executing on a computer behind a firewall to public network 214. Agent 222 receives a request for data from gateway 212, reformats the request into an HTTP request for legacy system 216, and uses service1 218 to supply a response to the request. Once a response from the service is received at agent 222, agent 222 creates a WebSocket protocol-compliant response with information provided by the service to send back to gateway 212. Gateway 212 can then re-translate the data into an HTTP format in order to send the data back to mobile device 224. Service2 220 can also be used in conjunction, or separately, from service1 218.

Figure 3:
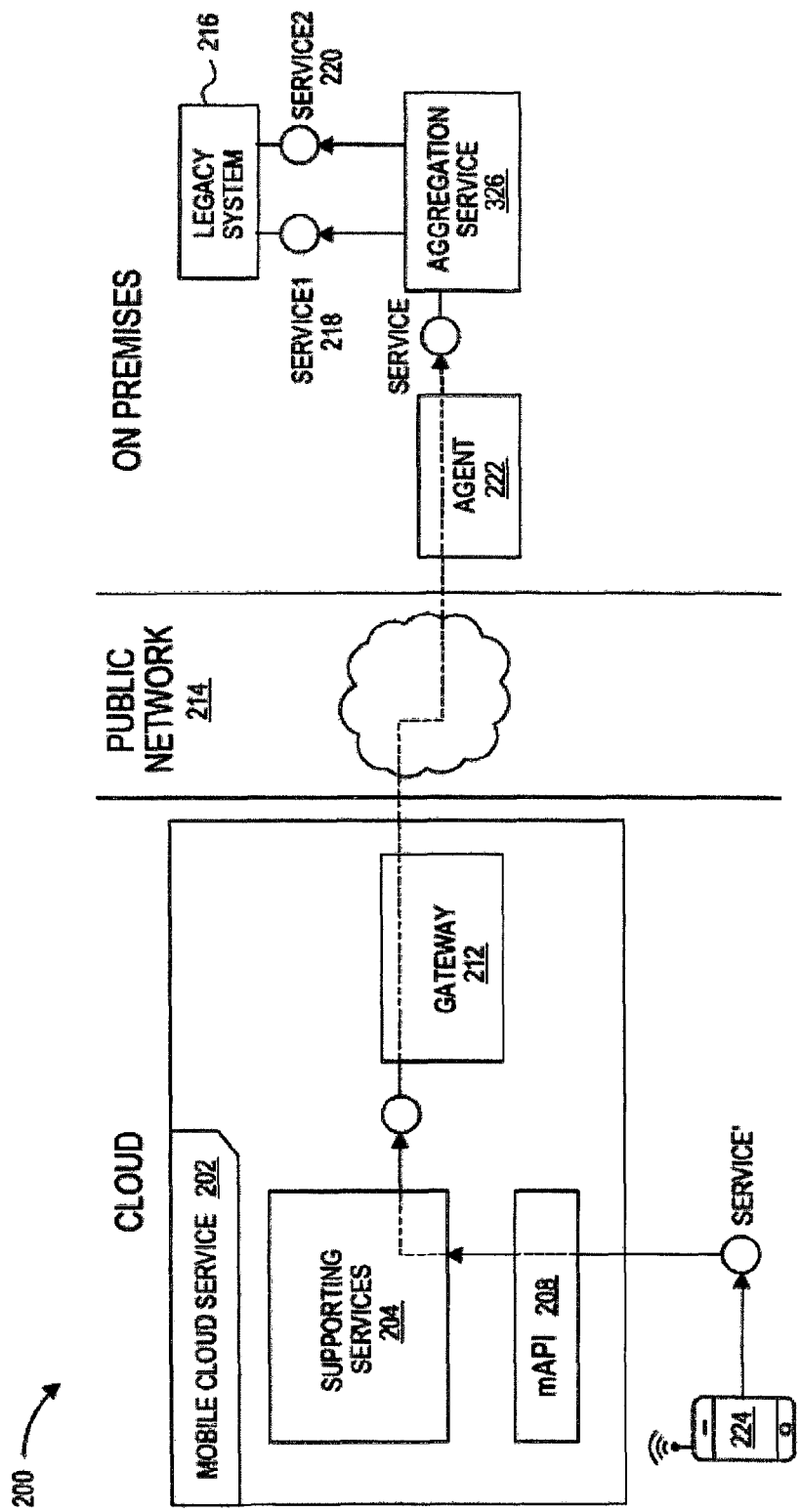
FIG. 3 illustrates an aggregation service in an on-premises environment in accordance with an embodiment.

FIG. 3 illustrates an aggregation service in an on-premises environment in accordance with an embodiment. The figure includes on-premises aggregation service 326, through which agent 222 communicates with service1 218 and service2 220 of legacy system 216.

A proposed approach is to "catch" HTTP packets (requests and responses), transfer the HTTP packets (requests and responses) to the other side and to forward the HTTP packets (requests and responses) with limited and well-defined set of modifications:

Request URL (uniform resource locator)—depending on chosen data routing configuration design, some parts of the URL might be rewritten (host/port parts or request path or both). URL rewriting should be a primary mechanism of translating requests:
  HTTP-request to Gateway to HTTP-request to Enterprise service.
  HTTP-request to Agent to HTTP-request to Cloud service.
Request/response headers—should be transferred and forwarded unchanged.
Request/response body—should be transferred and forwarded unchanged.
Request credentials—for each of the core HTTP (primarily Basic access authentication) and related (like OAuth) authentication methods.

As a data transfer container, the most performance-efficient format can be freely chosen (XML, JSON, BSON (binary JSON), etc.) if it is acceptable by a finally chosen agent-to-gateway communication technology (some of the known alternatives have known limitations, i.e. XML-only data transfer).

Using with Service Orchestration Solutions

Transaction propagation or compensation actions, protocol translation, data transformation, service orchestration/aggregation, messages sequencing/parallelization all are not a part of the connectivity, but they can be achieved by combining a provided solution with specific solutions. Those solutions can be deployed both in cloud and on premises.

System Start Up Example
1. When the Agent in on-premise system goes up it connects to the Gateway using HTTP/HTTPS proxy and establishes WebSocket connection between Agent and Gateway. This connection is going to be used to transfer data in both directions.
2. Agent downloads its own configuration from the Gateway, including filters, access control lists, and update availability.
3. After the startup Gateway listens for incoming HTTP calls in the cloud and Agent listens for incoming http calls in on-premises environment.

Figure 4:
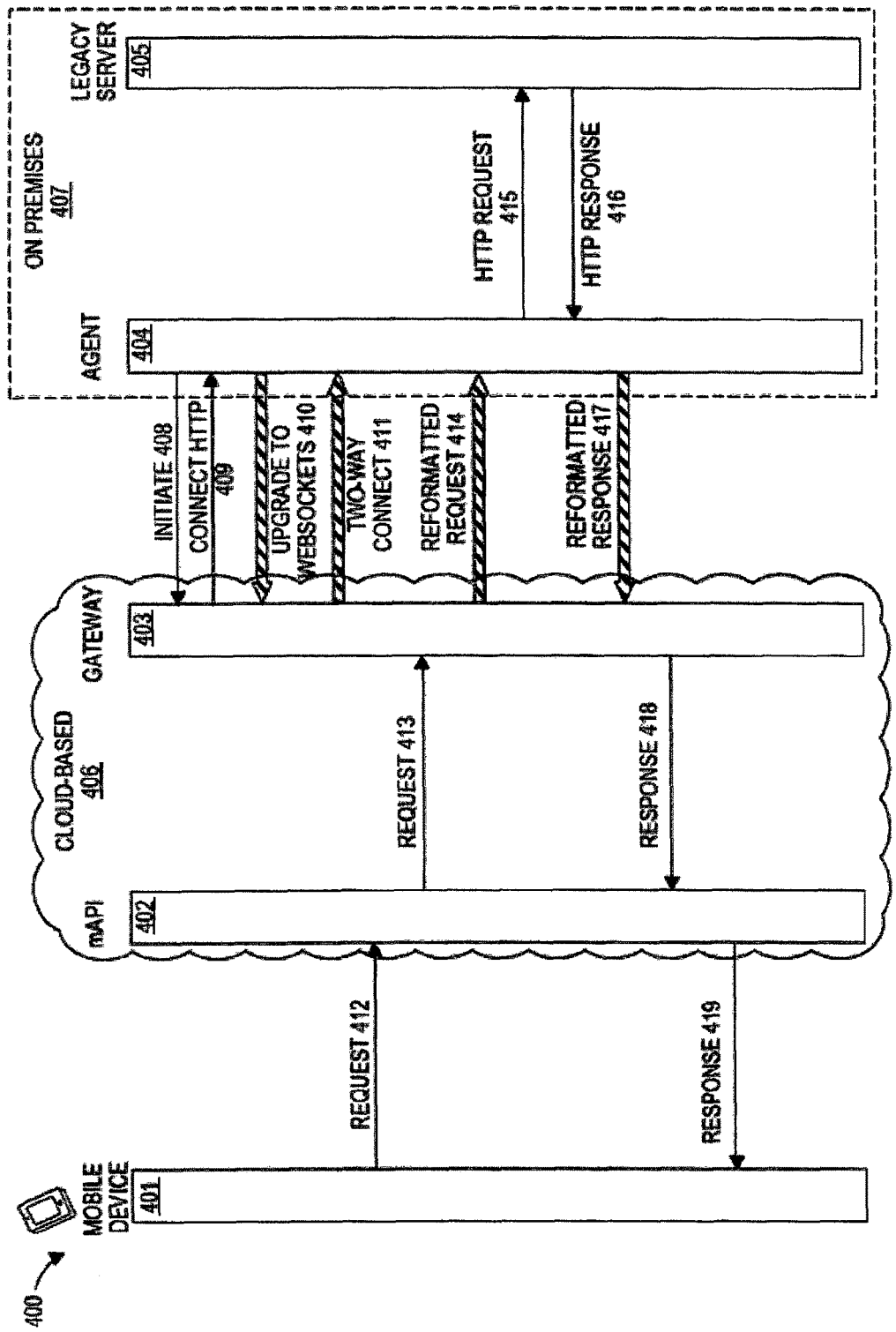
FIG. 4 is a sequence diagram in accordance with an embodiment.

Application in the cloud calls REST WebService from on-premise environment.
1. Client (C) does http call to the Gateway, endpoint Gateway_E1
2. Listener receives the request to address Gateway_E1
3. HTTP translator translate the address to E1 and prepares the address, header and body to be transferred over transport channel.
4. Synchronization module assigns unique ID to the request, puts original thread on hold and adds the request to the outgoing queue
5. From the queue the request is transferred to Agent
6. On the Agent side the request is reconstructed address, headers and body to be a valid HTTP request
7. An outgoing call is made to the endpoint E1
8. Once response is received it is transferred to the Gateway FIG. 4 is a sequence diagram in accordance with an embodiment. In process 400, a connection between a cloud-based gateway and an on-premises agent is demonstrated.

Agent 404 initiates an HTTP connection 408 with gateway 403, and gateway 403 responds with a server connection 409. An "HTTP connection" can include a secure HTTPS connection. Agent 404 then requests 410 an upgrade for the connection to a WebSocket protocol, and gateway validates the upgrade in connection 411.

A User Datagram Protocol (UDP) message, called a datagram, can be used with the HTTP connection to send information back and forth between gateway 403, which is in the cloud, and agent 404, which is behind a firewall in the enterprise network.

Agent 404 can be a standalone Java application that requires minimal maintenance. The agent can check for an update of its own software, download it, and install it as a software update.

Agent 404 can look up or otherwise determine an acceptable (or unacceptable) period of time for updating its own software. For example, 2:00 am on a Sunday morning may be an acceptable time when there are the least number of users on the system. As another example, the agent may determine a usage pattern of loading on the agent and choose a time that there is a dip or minima in usage in order to seek a software update.

If there is a problem with installing the update, then the agent may roll back the installation of the downloaded software update to a previous (or later) version of the software. For example, if immediately after a software update the agent cannot connect with the cloud-based gateway 403, then the software update can be rolled back.

Sometime after initialization, a mobile device 401 sends a request 412 for data to mAPI 402 of cloud-based system 406. The request is forwarded to gateway 403, which reformats the request.

The reformatted request 414 is sent from gateway 403 to agent 404 that is on premises at company's location 407. Agent 404 translates the WebSockets format to an HTTP request and then sends the HTTP request 415 to legacy server 405, which runs an enterprise application.

Legacy server 405 sends an HTTP response 416 to agent 404, which reformats it for WebSockets. Reformatted response 417 is sent from the agent to gateway 403, which translates it to the format of the original request. Response 418 is sent from gateway 403 to mAPI, which sends it as response 419 to mobile device 401.

Figure 5:
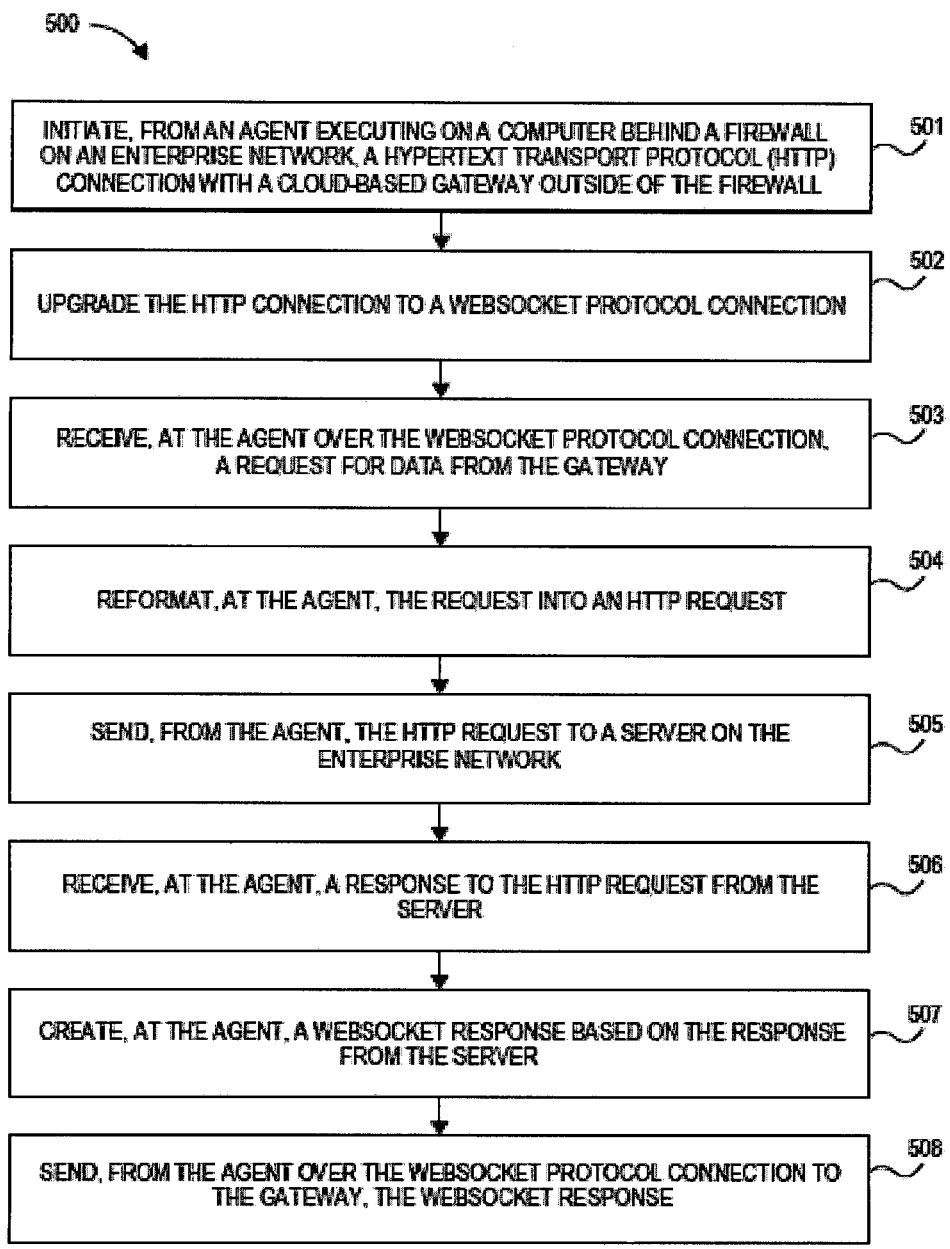
FIG. 5 is an example flowchart illustrating a process in accordance with an embodiment.

FIG. 5 is an example flowchart illustrating a process in accordance with one embodiment. This process can be automated in a computer or other machine. The process can be coded in software, firmware, or hard coded as machine-readable instructions and run through a processor that can implement the instructions. In operation 501, a hypertext transport protocol (HTTP) connection is initiated from an agent executing on a computer behind a firewall on an enterprise network with a cloud-based gateway outside of the firewall. In operation 502, the HTTP connection is upgraded to a WebSocket protocol connection. In operation 503, a request for data from the gateway is received at the agent over the WebSocket protocol connection. In operation 504, the request is reformatted, at the agent, into an HTTP request. In operation 505, the HTTP request is sent from the agent to a server on the enterprise network. In operation 506, a response to the HTTP request is received from the server at the agent. In operation 507, a WebSocket response is created at the agent based on the response from the server. In operation 508, the WebSocket response is sent from the agent over the WebSocket protocol connection to the gateway.

Figure 6:
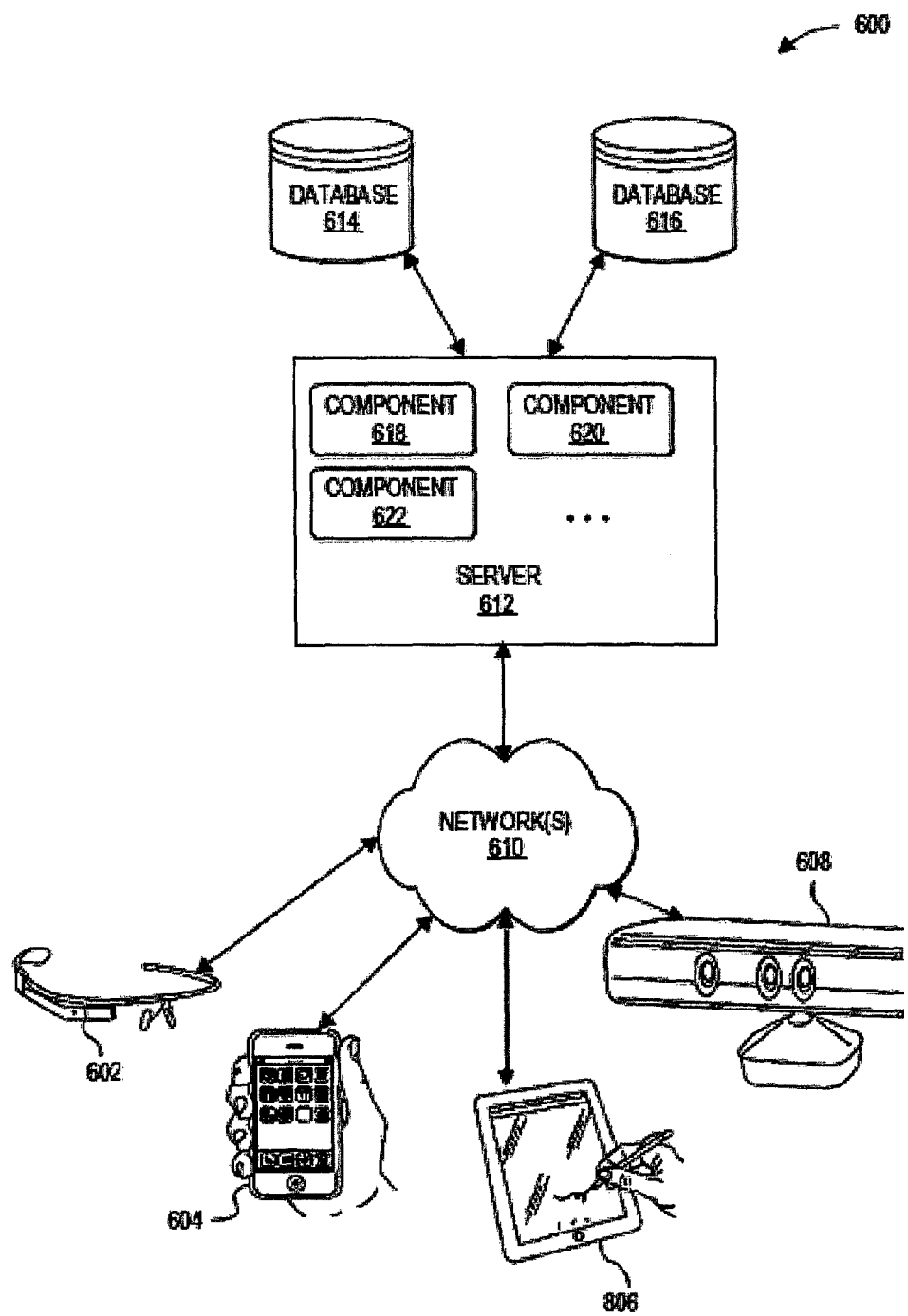
FIG. 6 depicts a simplified diagram of a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers miming any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from. Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
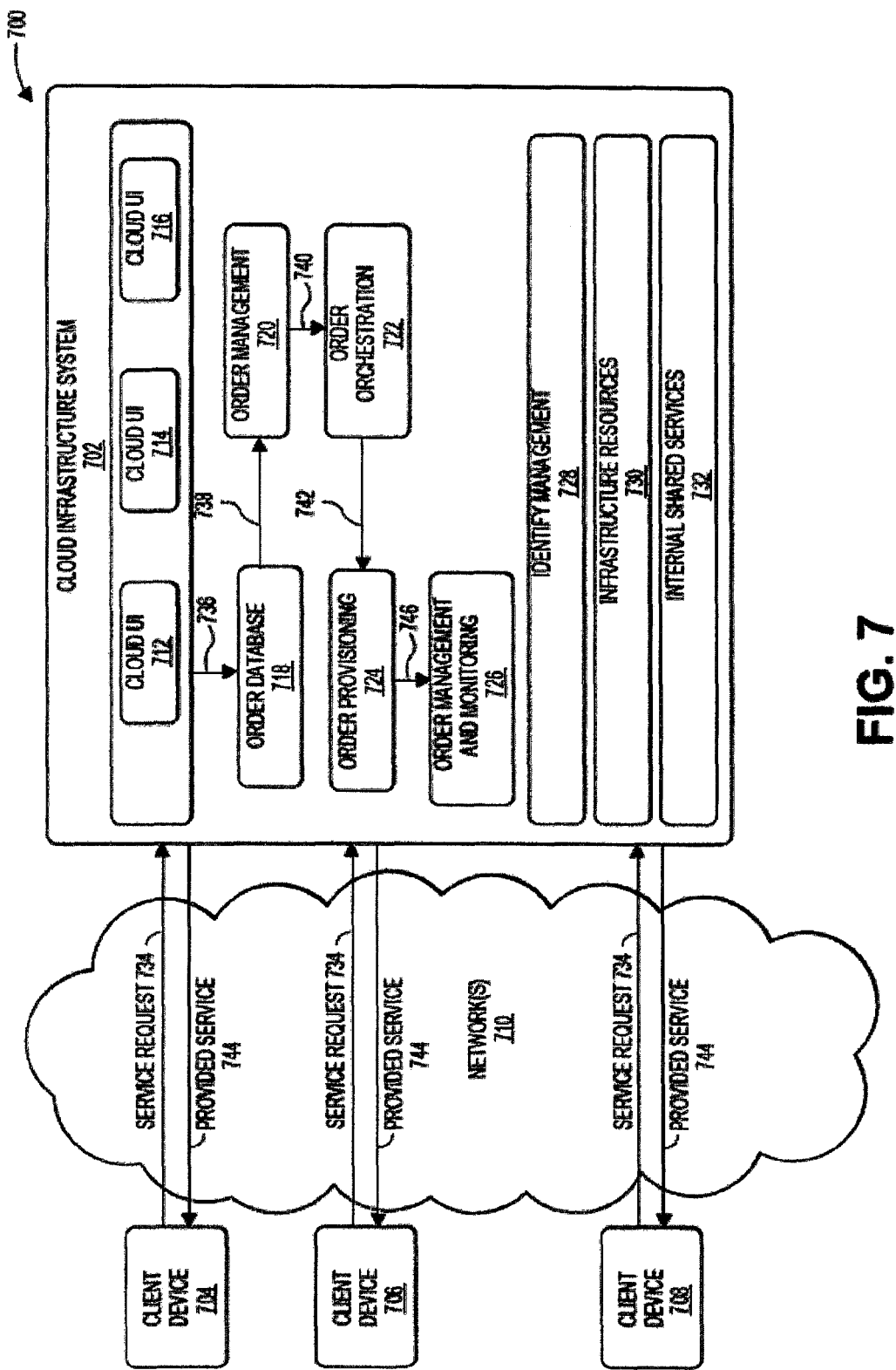
FIG. 7 is a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order.

Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.). Identity management module 728 may also include the management of descriptive information about each customer and about how and by whom that descriptive information can be accessed and modified.

Figure 8:
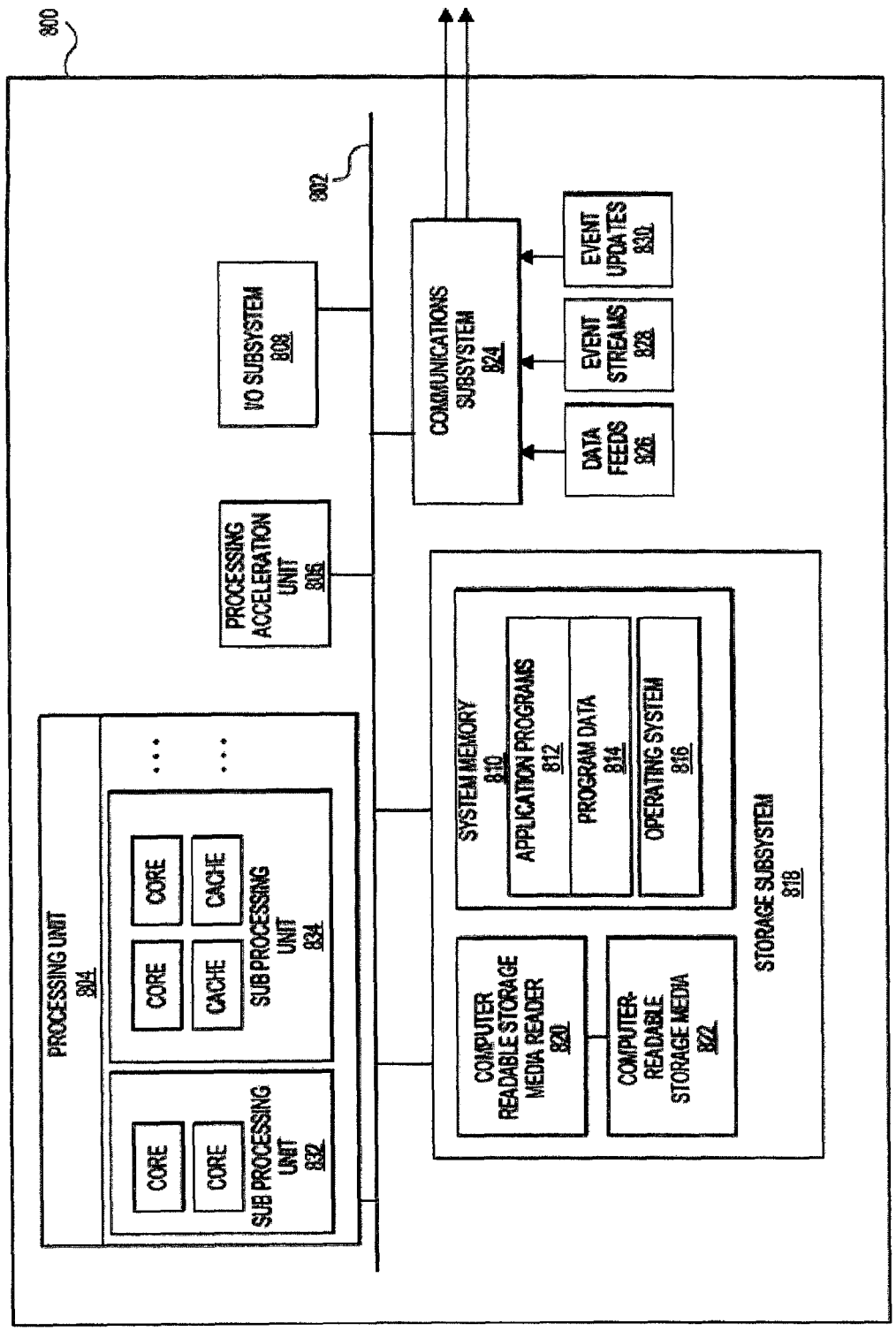
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social media networks and/or other communication services such as Twitter® feeds, Facebook® updates, web feeds such as Rich. Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 9:
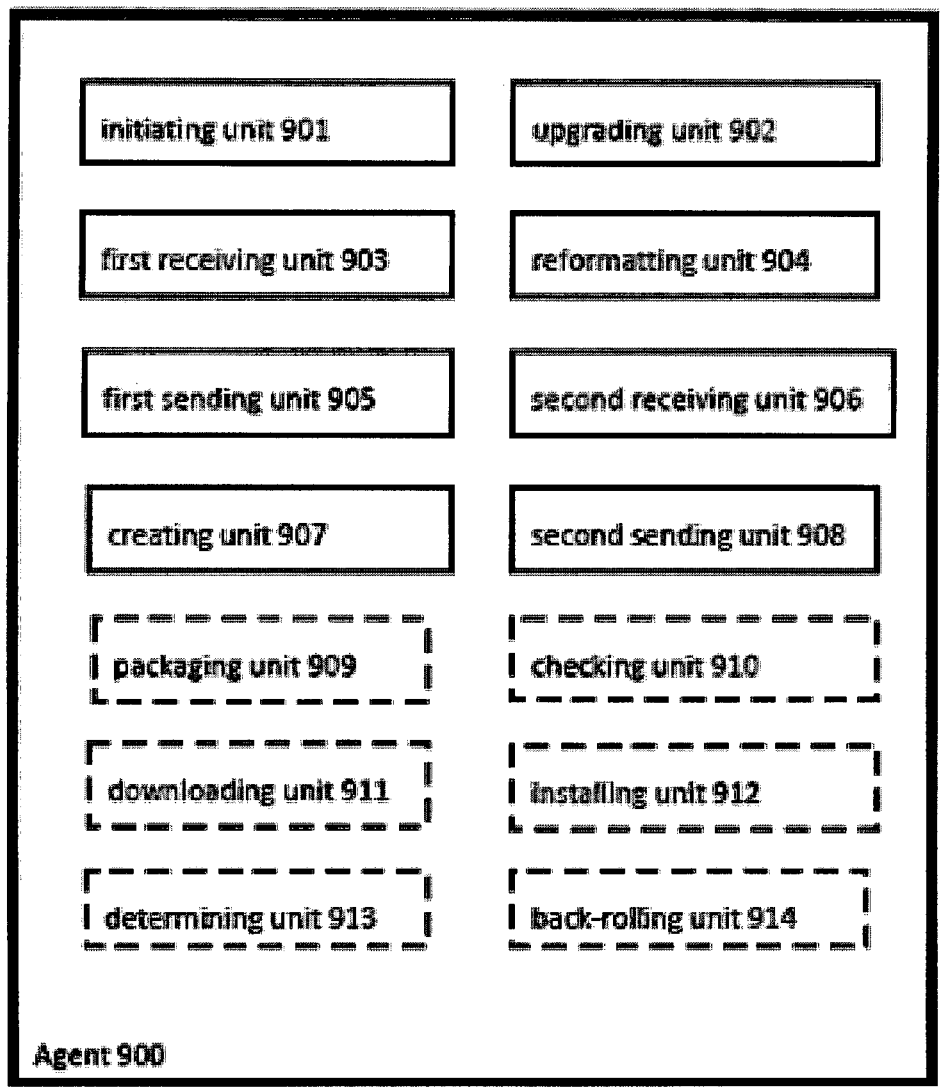
FIG. 9 is a block diagram of an agent in accordance with an embodiment.

FIG. 9 is a block diagram of an agent 900 in accordance with an embodiment. The blocks of the agent 900 may be implemented by hardware, software, or a combination of hardware and software to carry out the principles of aspects of the invention. It is understood by those skilled in the art that the blocks described in the figure may be combined or separated into sub-blocks to implement the principles of the invention as described above. For example, the first receiving unit 903 and the second receiving unit 906 can be integrated into one receiving unit. Therefore, the description herein may support any possible combination or separation or further definition of the functional blocks described herein.

As shown, the agent 900 for facilitating offsite access to an enterprise computer network comprises an initiating unit 901, an upgrading unit 902, a first receiving unit 903, a reformatting unit 904, a first sending unit 905, a second receiving unit 906, a creating unit 907, and a second sending unit 908. The initiating unit 901 can initiate a hypertext transport protocol (HTTP) connection with a cloud-based gateway outside of a firewall on an enterprise network. The agent executes on a computer behind the firewall. The upgrading unit 902 can upgrade the HTTP connection to a WebSocket protocol connection. The first receiving unit 903 can receive, over the WebSocket protocol connection, a request for data from the gateway. The reformatting unit 904 can reformat the request into an HTTP request. The first sending unit 905 can send the HTTP request to a server (not shown) on the enterprise network. The second receiving unit 906 can receive a response to the HTTP request from the server. The creating unit 907 can create a WebSocket response based on the response from the server. The second sending unit 908 can send, over the WebSocket protocol connection to the gateway, the WebSocket response.

In accordance with some embodiments of the invention, the upgrading of the HTTP connection to the WebSocket protocol connection can be automatically triggered by the initiating of the HTTP connection.

In accordance with some embodiments of the invention, the agent 900 can further comprise a packaging unit 909. The packaging unit 909 can package the response from the server into a string, binary object, or ArrayBuffer of the WebSocket response before sending the WebSocket response.

In accordance with some embodiments of the invention, the server can be a local web server.

In accordance with some embodiments of the invention, the server can be running an enterprise application.

In accordance with some embodiments of the invention, the WebSocket connection can be a secure WebSocket connection.

In accordance with some embodiments of the invention, the agent 900 can further comprise a checking unit 910, a downloading unit 911, and an installing unit 912. The checking unit 910 can check, with the cloud-based gateway, for an update of agent software. The downloading unit 911 can download a software update. The installing unit 912 can install the downloaded software update.

In accordance with some embodiments of the invention, the agent 900 can further comprise a determining unit 913. The determining unit 913 can determine a time window acceptable or unacceptable for the software update. The checking, downloading, or installing can be performed based on the determined time window.

In accordance with some embodiments of the invention, the agent 900 can further comprise a back-rolling unit 914. The back-rolling unit 914 can roll back the installation of the downloaded software update to a previous version of the agent software.

Figure 10:
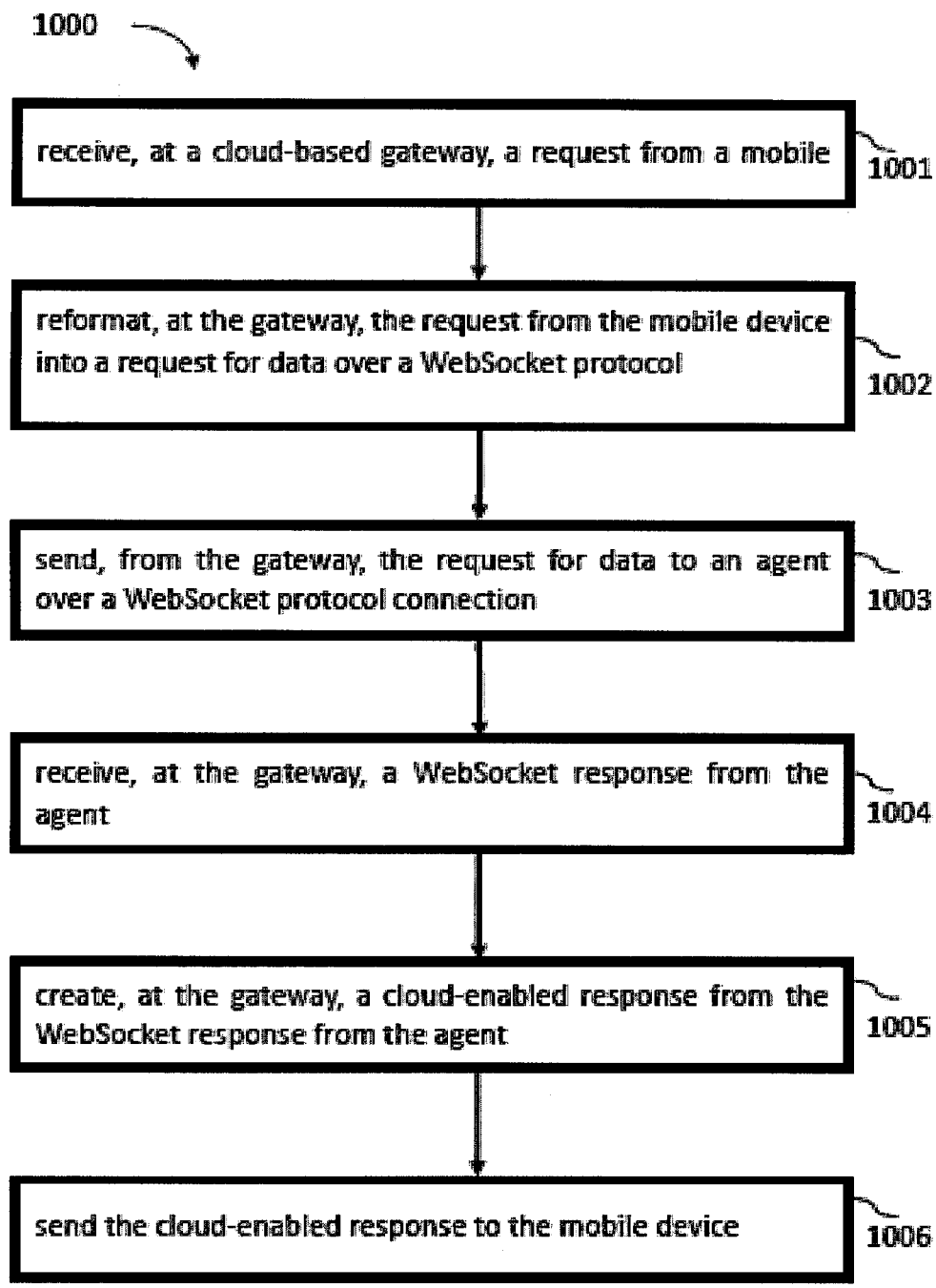
FIG. 10 is an example flowchart illustrating a process in a cloud-based gateway in accordance with an embodiment.

FIG. 10 is an example flowchart illustrating a process in a cloud-based gateway in accordance with an embodiment. This process can be automated in a computer or other machine. The process can be coded in software, firmware, or hard coded as machine-readable instructions and run through a processor that can implement the instructions. In operation 1001, a request from a mobile is received at a cloud-based gateway. In operation 1002, the request from the mobile device is reformatted, at the gateway, into a request for data over the WebSocket protocol. In operation 1003, the request for data is sent from the gateway to an agent over a WebSocket protocol connection. In operation 1004, a WebSocket response is received from the agent the request at the gateway. In operation 1005, a cloud-enabled response is created at the gateway from the WebSocket response from the agent. In operation 1006, the cloud-enabled response is sent to the mobile device.

In accordance with some embodiments of the invention, the WebSocket protocol connection can be a secure WebSocket protocol connection.

Figure 11:
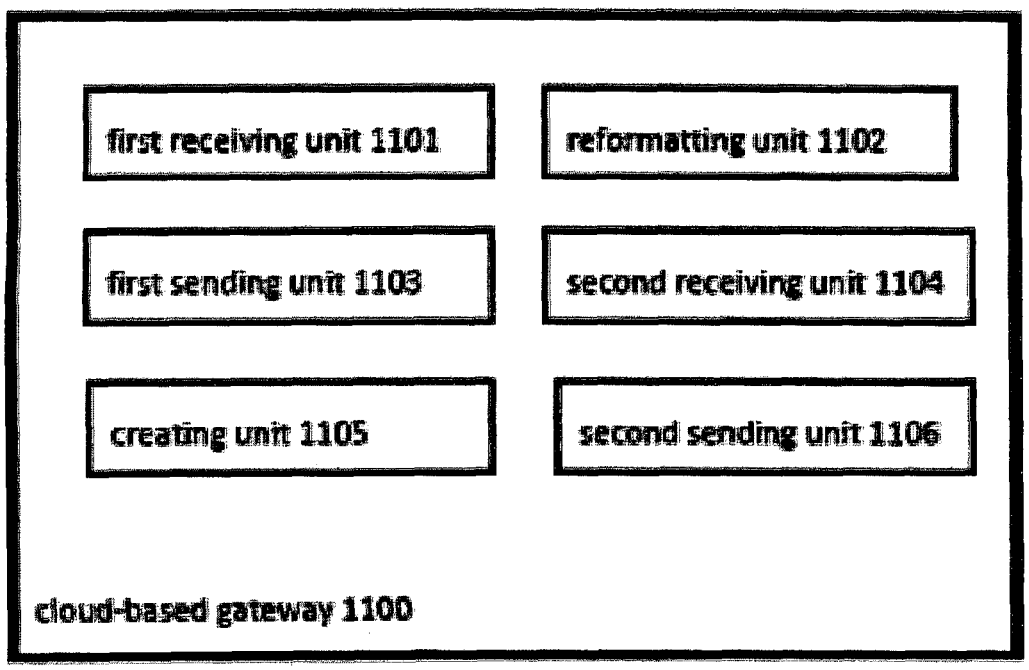
FIG. 11 is a block diagram of a cloud-based gateway in accordance with an embodiment.

FIG. 11 is a block diagram of a cloud-based gateway 1100 in accordance with an embodiment. As shown in the figure, the cloud-based gateway 1100 comprises a first receiving unit 1101, a reformatting unit 1102, a first sending unit 1103, a second receiving unit 1104, a creating unit 1105, and a second sending unit 1106. The first receiving unit 1101 can receive a request from a mobile device. The reformatting unit 1102 can reformat the request from the mobile device into a request for data over a WebSocket protocol. The first sending unit 1103 can send the request for data to an agent over a WebSocket protocol connection. The second receiving unit 1104 can receive a WebSocket response from the agent. The creating unit 1105 can create a cloud-enabled response from the WebSocket response from the agent. The second sending unit 1106 can send the cloud-enabled response to the mobile device.

In accordance with some embodiments of the invention, the WebSocket protocol connection can be a secure WebSocket protocol connection.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The following items include apparatuses.

Item 1. An agent (900) for facilitating offsite access to an enterprise computer network, the agent comprising:
  an initiating unit (901) configured for initiating a hypertext transport protocol (HTTP) connection with a cloud-based gateway outside of a firewall on an enterprise network, the agent executing on a computer behind the firewall;
  an upgrading unit (902) configured for upgrading the HTTP connection to a WebSocket protocol connection;
  a first receiving unit (903) configured for receiving, over the WebSocket protocol connection, a request for data from the gateway;
  a reformatting unit (904) configured for reformatting the request into an HTTP request;
  a first sending unit (905) configured for sending the HTTP request to a server on the enterprise network;
  a second receiving unit (906) configured for receiving a response to the HTTP request from the server;
  a creating unit (907) configured for creating a WebSocket response based on the response from the server; and
  a second sending unit (908) configured for sending, over the WebSocket protocol connection to the gateway, the WebSocket response.

Item 2. The agent of item 1 wherein the upgrading of the HTTP connection to the WebSocket protocol connection is automatically triggered by the initiating of the HTTP connection.

Item 3. The agent of any preceding item further comprising:
  a packaging unit (909) configured for packaging the response from the server into a string, binary object, or ArrayBuffer of the WebSocket response before sending the WebSocket response.

Item 4. The agent of any preceding item wherein the server is a local web server.

Item 5. The agent of any preceding item wherein the server is running an enterprise application.

Item 6. The agent of any preceding item wherein the WebSocket protocol connection is a secure WebSocket protocol connection.

Item 7. The agent of any preceding item further comprising:
  a checking unit (910) configured for checking, with the cloud-based gateway, for an update of agent software;
  a downloading unit (911) configured for downloading a software update; and
  an installing unit (912) configured for installing the downloaded software update.

Item 8. The agent of item 7 further comprising:
a determining unit (913) configured for determining a time window acceptable or unacceptable for the software update; and
the checking, downloading, or installing are performed based on the determined time window.

Item 9. The agent of item 7 or 8 further comprising:
a back-rolling unit (914) configured for rolling back the installation of the downloaded software update to a previous version of the agent software.

Item 10. A method of facilitating offsite access to an enterprise computer network, the method comprising:
receiving, at a cloud-based gateway, a request from a mobile device;
reformatting, at the gateway, the request from the mobile device into a request for data over a WebSocket protocol;
sending, from the gateway, the request for data to an agent over a WebSocket protocol connection;
receiving, at the gateway, a WebSocket response from the agent;
creating, at the gateway, a cloud-enabled response from the WebSocket response from the agent; and
sending the cloud-enabled response to the mobile device.

Item 11. The method of item 10, wherein the WebSocket protocol connection is a secure WebSocket protocol connection.

Item 12. A cloud-based gateway, comprising:
a first receiving unit, configured for receiving a request from a mobile device;
a reformatting unit, configured for reformatting the request from the mobile device into a request for data over a WebSocket protocol;
a first sending unit, configured for sending the request for data to an agent over a WebSocket protocol connection;
a second receiving unit, configured for receiving a WebSocket response from the agent;
a creating unit, configured for creating a cloud-enabled response from the WebSocket response from the agent; and
a second sending unit, configured for sending the cloud-enabled response to the mobile device.

Item 13. The cloud-based gateway of item 12, wherein the WebSocket protocol connection is a secure WebSocket protocol connection.

What is claimed is:

1. A method of facilitating offsite access to an enterprise computer network, the method comprising:
initiating, by an agent executing on a computer behind a firewall on an enterprise network, a hypertext transport protocol (HTTP) connection with a cloud-based gateway outside of the firewall;
responsive to initiating the HTTP connection, automatically upgrading the HTTP connection with the cloud-based gateway to a WebSocket protocol connection;
receiving, from the cloud-based gateway, by the agent, over the WebSocket protocol connection, a first request for data stored on a server behind the firewall on the enterprise network, wherein the first request has a WebSocket format compliant for the WebSocket protocol connection;
translating, by the agent, the first request received from the cloud-based gateway into a second request having an HTTP format for communication with the server on the enterprise network, wherein translating includes converting the WebSocket format of the first request to the HTTP format for the second request for communication with the server;
sending, from the agent, the second request to the server on the enterprise network;
receiving, by the agent, a first response to the second request from the server, the first response having the HTTP format;
creating, by the agent, a second response having the WebSocket format, wherein the second response is created based on converting the first response from the HTTP format to the WebSocket format; and
sending, by the agent, over the WebSocket protocol connection, to the cloud-based gateway, the second response.

2. The method of claim 1 further comprising:
receiving, at the cloud-based gateway, a third request from a mobile device;
reformatting, at the cloud-based gateway, the third request from the mobile device into the first request for data over the WebSocket protocol connection;
receiving, at the cloud-based gateway, the second response from the agent;
creating, at the cloud-based gateway, a third response from the second response from the agent; and
sending the third response to the mobile device.

3. The method of claim 1 further comprising:
packaging, by the agent, the first response from the server into a string, a binary object, or an ArrayBuffer of the second response before sending the second response.

4. The method of claim 1 wherein the server is a local web server.

5. The method of claim 1 wherein the server is running an enterprise application.

6. The method of claim 1 wherein the WebSocket protocol connection is a secure WebSocket protocol connection.

7. The method of claim 1 further comprising:
checking, by the agent with the cloud-based gateway, for an update of an agent software;
downloading, to the agent, a software update; and
installing, at the agent, the downloaded software update.

8. The method of claim 7 further comprising:
determining a time window acceptable or unacceptable for the software update; and
performing the checking, downloading, or installing based on the determined time window.

9. The method of claim 7 further comprising:
rolling back the installing of the downloaded software update to a previous version of the agent software.

10. A machine-readable non-transitory medium embodying information indicative of instructions for causing one or more machines to perform operations comprising:
initiating, by an agent executing on a computer behind a firewall on an enterprise network, a hypertext transport protocol (HTTP) connection with a cloud-based gateway outside of the firewall;
responsive to initiating the HTTP connection, automatically upgrading the HTTP connection with the cloud-based gateway to a WebSocket protocol connection;
receiving, from the cloud-based gateway, by the agent, over the WebSocket protocol connection, a first request for data stored on a server behind the firewall on the enterprise network, wherein the first request has a WebSocket format compliant for the WebSocket protocol connection;
translating, by the agent, the first request received from the cloud-based gateway into a second request having an HTTP format for communication with the server on the enterprise network, wherein translating includes converting the WebSocket format of the first request to the HTTP format for the second request for communication with the server;

sending, from the agent, the second request to the server on the enterprise network;

receiving, by the agent, a first response to the second request from the server, the first response having the HTTP format;

creating, by the agent, a second response having the WebSocket format, wherein the second response is created based on converting the first response from the HTTP format to the WebSocket format; and sending, by the agent, over the WebSocket protocol connection, to the cloud-based gateway, the second response.

11. The machine-readable non-transitory medium of claim 10 wherein the operations further comprise:

receiving, at the cloud-based gateway, a third request from a mobile device;

reformatting, at the cloud-based gateway, the third request from the mobile device into the first request for data over the WebSocket protocol connection;

receiving, at the cloud-based gateway, the second response from the agent;

creating, at the cloud-based gateway, a third response from the second response from the agent; and sending the third response to the mobile device.

12. The machine-readable non-transitory medium of claim 10 wherein the operations further comprise:

checking, by the agent with the cloud-based gateway, for an update of an agent software;

downloading, to the agent, a software update; and installing, at the agent, the downloaded software update.

13. The machine-readable non-transitory medium of claim 12 wherein the operations further comprise:

determining a time window acceptable or unacceptable for the software update; and performing the checking, downloading, or installing based on the determined time window.

14. A system for facilitating offsite access to an enterprise computer network, the system comprising:

at least one processor; and a memory operatively coupled with the at least one processor, the at least one processor executing instructions from the memory for:

initiating, by an agent executing on a computer behind a firewall on an enterprise network, a hypertext transport protocol (HTTP) connection with a cloud-based gateway outside of the firewall;

responsive to initiating the HTTP connection, automatically upgrading the HTTP connection with the cloud-based gateway to a WebSocket protocol connection;

receiving, from the cloud-based gateway, by the agent, over the WebSocket protocol connection, a first request for data stored on a server behind the firewall on the enterprise network, wherein the first request has a WebSocket format compliant for the WebSocket protocol connection;

translating, by the agent, the first request received from the cloud-based gateway into a second request having an HTTP format for communication with the server on the enterprise network, wherein translating includes converting the WebSocket format of the first request to the HTTP format for the second request for communication with the server;

sending, from the agent, the second request to the server on the enterprise network;

receiving, by the agent, a first response to the second request from the server, the first response having the HTTP format;

creating, by the agent, a second response having the WebSocket format, wherein the second response is created based on converting the first response from the HTTP format to the WebSocket format; and sending, by the agent, over the WebSocket protocol connection, to the cloud-based gateway, the second response.

15. The system of claim 14 wherein the instructions from the memory further comprise:

receiving, at the cloud-based gateway, a third request from a mobile device;

reformatting, at the cloud-based gateway, the third request from the mobile device into the first request for data over the WebSocket protocol connection;

receiving, at the cloud-based gateway, the second response from the agent;

creating, at the cloud-based gateway, a third response from the second response from the agent; and sending the third response to the mobile device.

16. The system of claim 14 wherein the server is a local web server.

17. The system of claim 14 wherein the server is running an enterprise application.

* * * * *

UNITED STATES PATENT AND TRADEMARK OFFICE
CERTIFICATE OF CORRECTION

PATENT NO. : 9,769,139 B2  
APPLICATION NO. : 14/771745  
DATED : September 19, 2017  
INVENTOR(S) : Chizhov et al.

It is certified that error appears in the above-identified patent and that said Letters Patent is hereby corrected as shown below:

In the Specification

In Column 10, Line 31, delete "miming" and insert -- running --, therefor.

In Column 10, Line 58, delete "infra-red" and insert -- infrared --, therefor.

Signed and Sealed this  
Twenty-second Day of May, 2018

Andrei Iancu  
*Director of the United States Patent and Trademark Office*